United States Patent [19]

Nanos

[11] Patent Number: 5,369,246
[45] Date of Patent: Nov. 29, 1994

[54] TEMPERATURE CONTROL FOR LAMINATOR

[75] Inventor: Nicholas M. Nanos, Morton Grove, Ill.

[73] Assignee: General Binding Corporation, Northbrook, Ill.

[21] Appl. No.: 107,925

[22] Filed: Aug. 16, 1993

[51] Int. Cl.⁵ .............................................. F27B 9/06
[52] U.S. Cl. .................................... 219/388; 219/505; 219/497; 219/506; 156/322; 156/380.9
[58] Field of Search ............... 219/388, 505, 497, 506, 219/469, 471, 216; 392/417; 156/583.5, 583.1, 380.9, 320–322; 355/286, 285; 34/1 W, 1 BB, 41, 48; 101/424.1

[56] References Cited

U.S. PATENT DOCUMENTS

| | | |
|---|---|---|
| 3,705,289 | 12/1972 | Szostak et al. |
| 3,947,656 | 3/1976 | Lodi . |
| 4,180,721 | 12/1979 | Watanabe et al. .................. 219/388 |
| 4,354,095 | 10/1982 | de Vries ........................... 219/388 |
| 4,416,719 | 11/1983 | Horiuchi . |
| 4,435,637 | 3/1984 | de Vries ........................... 219/388 |
| 4,599,128 | 7/1986 | Held . |
| 4,745,430 | 5/1988 | Tsuchiya . |
| 5,081,340 | 1/1992 | Levitan . |
| 5,117,562 | 6/1992 | Dulay et al. ........................ 34/48 |
| 5,276,978 | 1/1994 | Hopkins et al. ..................... 34/48 |

OTHER PUBLICATIONS

"Features and Applications RCA Integrated-Circuit Zero-Voltage Switches (CA 3084, CA 3059, and CA 3079)", RCA Solid State '74 Databook Series SSD-206B, pp. 475–502, 1974.

*Primary Examiner*—Bruce A. Reynolds
*Assistant Examiner*—John A. Jeffery
*Attorney, Agent, or Firm*—Hill, Steadman & Simpson

[57] ABSTRACT

A laminator temperature control includes a control circuit having a sensing amplifier that drives a triac to control power to PTC heating elements. A temperature sensor at an input of the sensing amplifier causes power to be inhibited to the heating elements when a predetermined adjustable temperature is reached by heating plates positioned between two pairs of rollers. When the heating plate temperature is below the predetermined temperature, proportioned control of the power supply duty cycle is provided. Indicators display the power supply status and temperature ready status of the laminator.

3 Claims, 3 Drawing Sheets

TEMPERATURE CONTROL FOR LAMINATOR

BACKGROUND OF THE INVENTION

1. Field of the Invention

The present invention relates generally to a temperature control circuit, and more particularly to a proportional temperature controller for a PTC heater in a laminator.

2. Description of the Related Art

U.S. Pat. No. 4,745,430 discloses a malfunction detecting device in a temperature control circuit for an image fixing station of a photocopier. A heater mounted within a roller in the fixing station is connected to an AC power supply by a triac. Triggering of the triac is controlled by a circuit having two resistance bridges connected to the inputs of a comparator, one resistance bridge having a thermistor as a temperature sensing element. The output of the comparator drives a transistor that causes the trigger circuit to output a high signal at the triac gate. A combination of a ready circuit and an AND gate transmit a signal to a microcomputer for prohibiting copying when the heater temperature falls below 150° C.

U.S. Pat. No. 3,947,656 discloses a temperature controlled cartridge heater for severing vinyl film. A tubular sheath contains heating elements controlled by a comparator-detector using an RCA 3079 integrated circuit triggering a triac. A thermistor in one leg of a bridge circuit with a resistor in the other leg is input to the integrated circuit, which triggers the triac to connect or disconnect power to the heating elements.

U.S. Pat. No. 3,705,289 discloses a controlled heater in an electrostatic copier, in which a temperature varying resistor in one branch of a bridge circuit is fed to a differential amplifier that switches a relay to apply energy to a heating coil. A lamp and motor are controlled through two threshold circuits.

U.S. Pat. No. 4,599,128 discloses an apparatus and process for producing metal clad laminates for circuit boards. The layers are fed through a dual belt press having two pairs of rotating drums supporting the two belts and between which is a pair of heated pressure plates.

U.S. Pat. No. 4,416,719 discloses an identification card laminating apparatus having a pair of rollers heated by heating lamps.

U.S. Pat. No. 5,081,340 discloses a heating element for a plastic film laminator having an aluminum base with conductive silicone in grooves formed in the base. Two such elements are mounted to form upper and lower heating elements.

SUMMARY OF THE INVENTION

An object of the present invention is to provide tight control of temperatures for a heater of a laminator apparatus.

Another object of the invention is to provide proportional control of a PTC element in heater.

Yet another object is to provide a pouch laminator, either for identification card size or document size laminates, which provides effective lamination of a document.

These and other objects and advantages of the invention are provided in a temperature control for a laminator having at least one heating plate on which is mounted a heating element having a positive temperature coefficient (PTC). The power to the PTC heater is controlled by a triac having its gate lead triggered by an integrated sensing amplifier. The integrated sensing amplifier provides zero-voltage logic switching of the triac on the basis of inputs connected to an arrangement of resistors with a thermistor. A potentiometer in the resistor arrangement provides temperature adjustability. An additional resistor and capacitor combination connected to the sensing amplifier causes a proportional control of the heating element, in which the sensing amplifier operates as a multivibrator and the duty cycle of its output changes to change the average power to the triac.

In addition, the present control includes a pair of indicators, such as light emitting elements, which are controlled to display a "power on" and a "ready" condition. The "ready" light indicates to the user when the proper laminating temperature is reached by the heating elements so that a roller motor may be switched into action to move the item to be laminated through the laminator.

An embodiment for laminating identification size cards and another embodiment for laminating page size documents are contemplated.

DETAILED DESCRIPTION OF THE PREFERRED EMBODIMENTS

Figure 1:
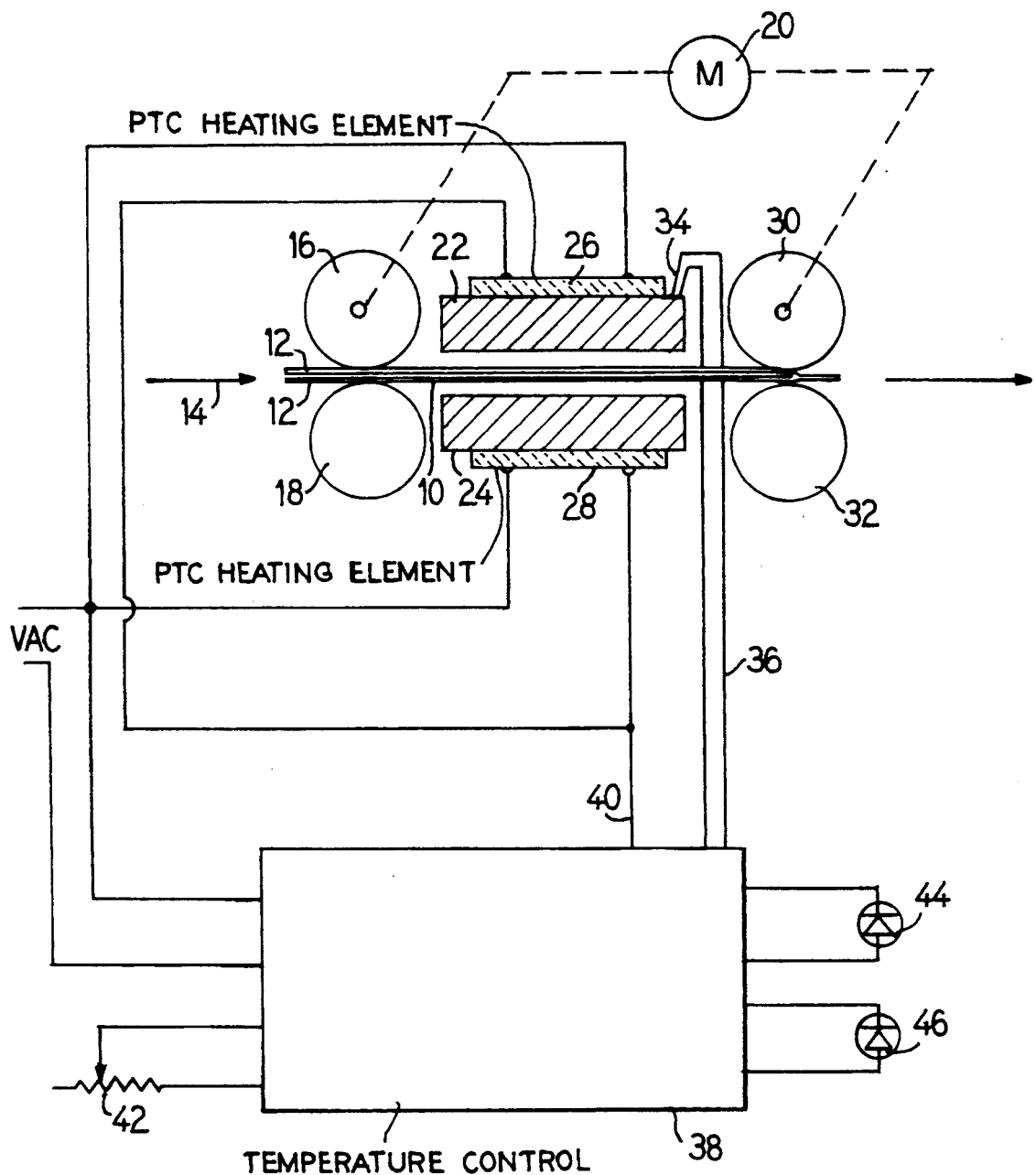
FIG. 1 is a diagrammatic view of a laminator and control according to the principles of the present invention.

In FIG. 1, an item 10 to be laminated is placed between two sheets 12 of a laminating material, which may be a single sheet folded about the item 10 to be laminated. The item 10 to be laminated may be an identification card (ID), drivers license, membership card, or it may be a larger document such as a letter size or legal size certificate or the like. Larger items for laminating such as maps or menus are also possible.

The sheets 12 used to laminate the item 10 are of plastic film and usually have a heat sensitive adhesive coated surface-wide on one face. The sheets 12 are arranged with the item 10 to be laminated therebetween and fed through the laminator apparatus, which heats and presses the sheets 12 together to form a single laminated document.

In the present laminator, the arrangement of sheets 12 with the item 10 positioned therebetween is fed in the direction of arrow 14 between a first pair of rollers 16 and 18. The rollers 16 and 18 are driven by a motor 20 to move the arrangement between a pair of heating plates 22 and 24 mounted opposite one another to form upper and lower heating plates. The heating plates 22 and 24 are, in a preferred embodiment, plates of aluminum having one or more ceramic positive temperature coefficient (PTC) heating elements 26 and 28, part no. DBK HP05 by David and Baaden GMbH, mounted on their outside surfaces. The heating plates 22 and 24 are spaced from one another by a distance greater than the thickness of the arrangement 12 and 14 so that heat is transferred to the arrangement 12 and 14 from the heating plates 22 and 24. The spaced heating plates thereby form an oven or pouch in which the heat sensitive adhesive is melted.

Once heated, the arrangement moves to between a second pair of rollers 30 and 32, which are also driven by the motor 20. The rollers 30 and 32 press the heated arrangement 12 and 14 together to form a unitary laminated document. The laminated document is then ejected from the laminator.

To assure that the heating plates 22 and 24 are maintained at a proper temperature range for effective lamination, a temperature sensor 34 is mounted on the upper heating plate 22. The temperature sensor 34 is connected via wires 36 to a temperature control 38. The temperature control 38 monitors the temperature of the heating plate 28 and applies power to the heating elements 26 and 28 through a control lead 40 as needed to maintain the desired temperature range.

The temperature range of the heating plates 22 and 24 is adjustable by an adjustment means 42, shown here as a potentiometer connected to the control 38. The temperature range may thereby be set to a range of optimum temperature for the specific laminate film and adhesive being used. A pair of indicator elements 44 and 46, shown here as light emitting diodes (LEDs), are also connected to the temperature control 38. The first indicator 44 indicates whether power is being applied to the laminator unit, in other words, whether it is "turned on." The second indicator 46 indicates the ready state of the present device, in other words, whether the heating plates 22 and 24 have reached the desired temperature range.

Figure 2:
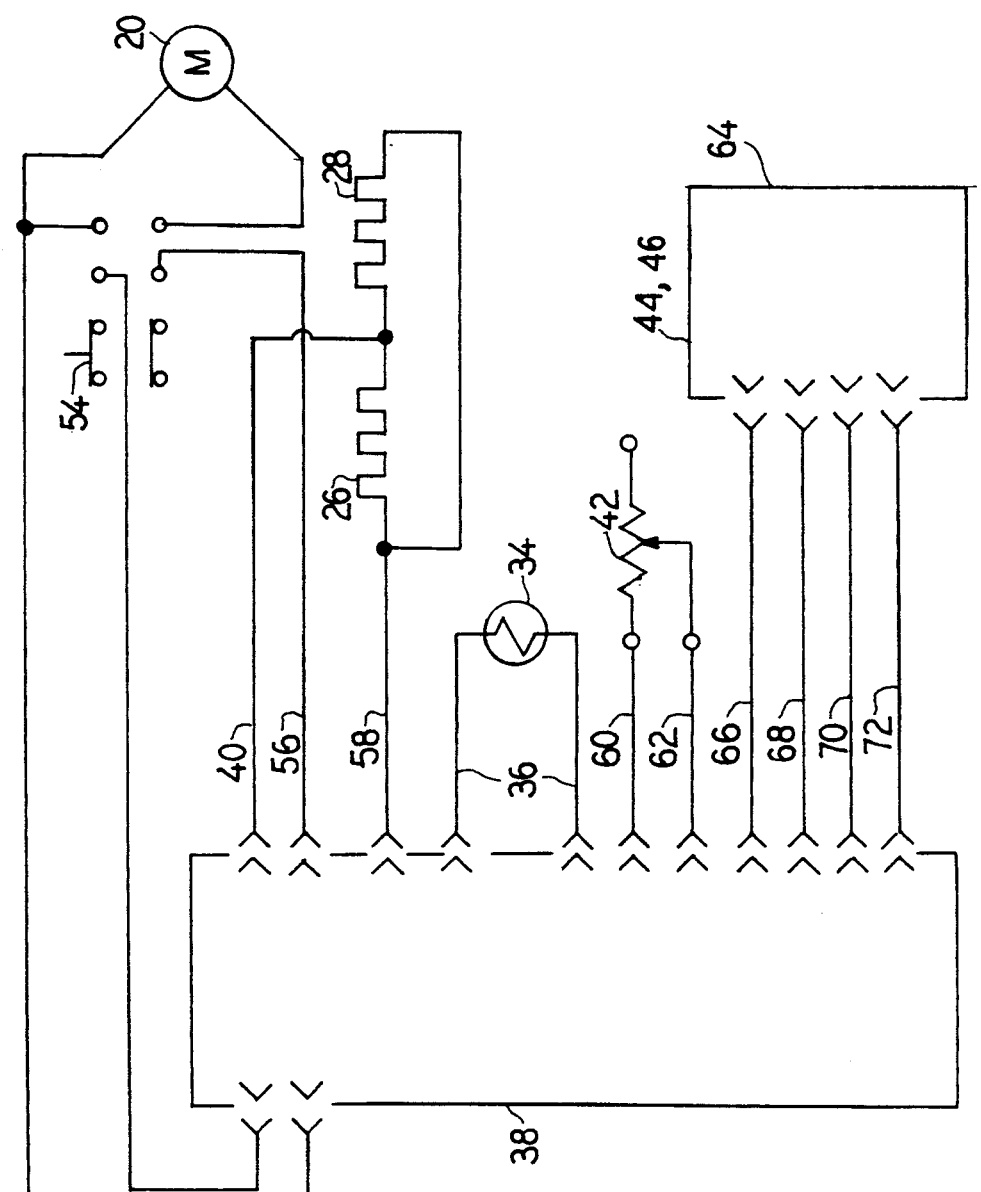
FIG. 2 is a diagram showing the control circuit board and the connections thereto.

Further detail is illustrated in FIG. 2, wherein the temperature control 38 is shown diagrammatically as the circuit board on which it is wired. Power is supplied to the control circuit board 38 through power supply leads 50 and 52. The positive power supply lead 50 branches off and passes through a three position switch 54 prior to reaching the control circuit board 38. The three position switch is shown in the off position. When moved to the first on position, power is supplied to the control circuit board 38 so that power is supplied to the heating elements 26 and 28. After operating temperature is reached, the indicator 46 instructs the operator to move the switch 54 to the full on position so that power is supplied to the motor 20, which is also connected to the control circuit board 38 by motor lead 56.

The heating elements 26 and 28 are connected in parallel and power is supplied to them from the control circuit board 38 by heater leads 40 and 58. The heating elements 26 and 28 are positive temperature coefficient (PTC) ceramic heating elements. The temperature sensor 34, which here is a negative temperature coefficient (NTC) element, is connected by the lead pair 36 to the control circuit board 38, and the adjustment means 42 is connected by leads 60 and 62.

The indicator means 44 and 46 are mounted on a separate circuit board 64, which is connected to the control circuit 38 by leads 66, 68, 70 and 72.

The embodiment shown in FIG. 2 has the two heating elements 26 and 28, one for each of the heating plates 22 and 24 shown in FIG. 1. The heating plates 22 and 24 are of a size corresponding to identification cards and the like and so this embodiment is primarily used for identification and membership cards, business cards, drivers licenses and the like.

Figure 3:
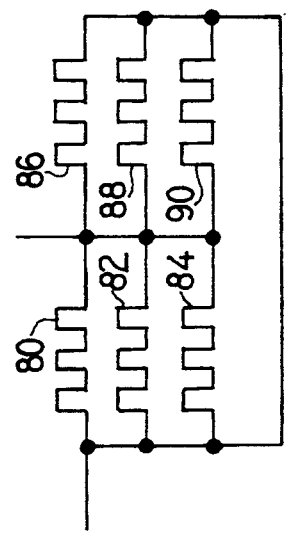
FIG. 3 is a heater arrangement for a page size document laminator according to a second embodiment.

It is often desired to laminate larger documents, such as menus, certificates, etc. which are letter size or larger. To accomplish this, heating plates of a correspondingly larger size are provided, such as letter size. In a second preferred embodiment as shown in FIG. 3, three positive temperature coefficient (PTC) ceramic heating elements are mounted on each of the aluminum heating plates, so that six heating elements 80, 82, 84, 86, 88 and 90 are provided in total. The six heating elements 80–90 are connected in parallel.

Figure 4:
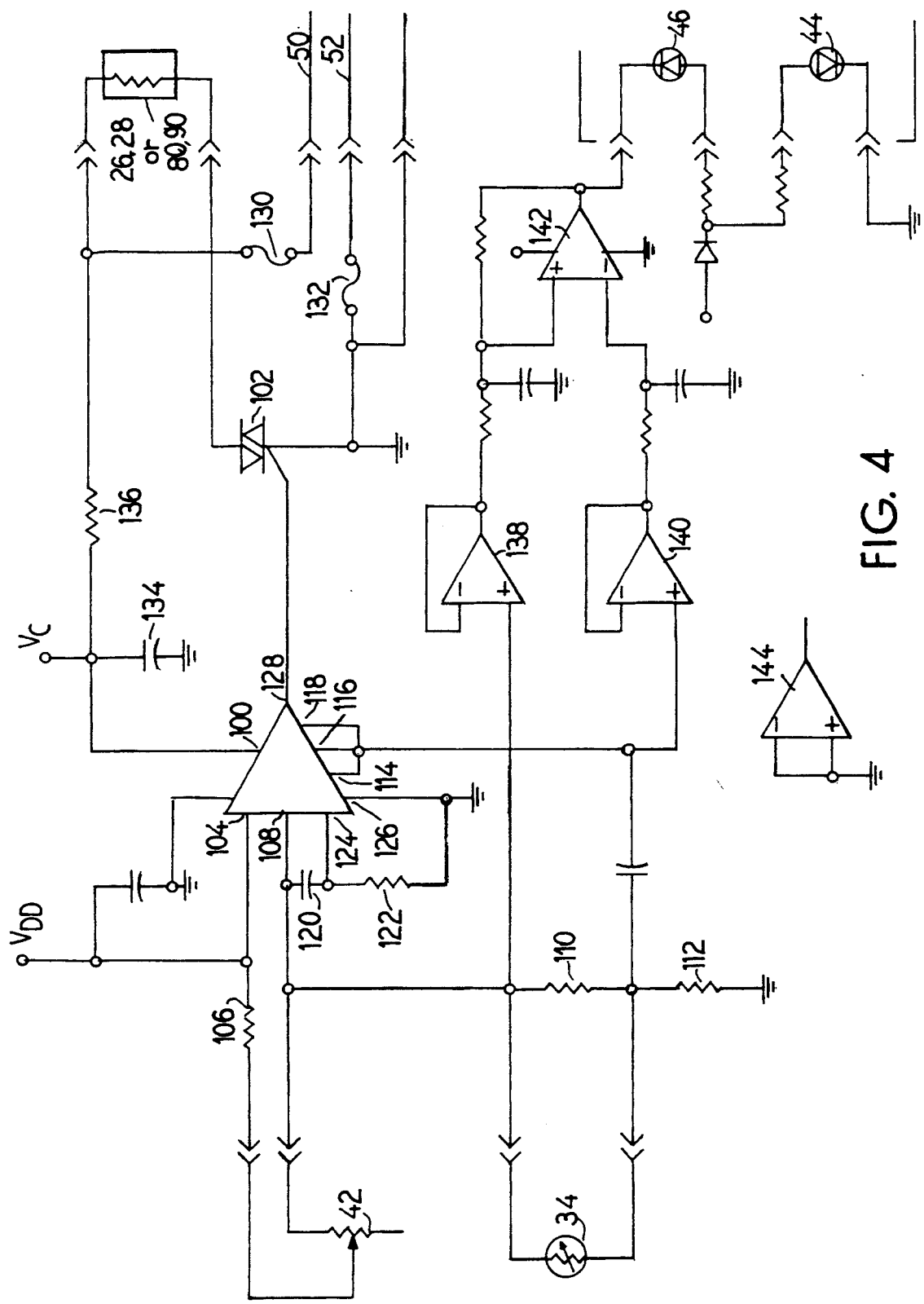
FIG. 4 is a circuit diagram of the control circuit of the present laminator.

Referring to FIG. 4, the circuit wired on the control circuit board 38 is shown in detail. The control circuit is based on a sensing amplifier 100 which drives a triac 102. The sensing amplifier of a preferred embodiment is an RCA CA 3059 integrated amplifier, which is connected as a multivibrator with proportional control of the duty cycle of the output signal. A first input 104 of the amplifier 100 is connected DC power, which is also supplied through a series connection of a resistor 106 and the adjustment means 42 to a sense input 108. The sense input 108 is connected to ground through a parallel combination of the temperature sensor 34 and a resistor 110, and then through a resistor 112. These elements set the voltage at the sense input 108. The voltage at sense input 108 is compared to a reference voltage at reference inputs 114, 116 and 118, which is set internally of the sensing amplifier 100.

Proportional control results from the connection of a capacitor 120 and a resistor 122 to the input 108 and inputs 124 and 126. A predetermined differential voltage at the input 108 is below the differential voltage, the output of the sensing amplifier 100 at lead 128 is inhibited. When the voltage at the input 108 rises to the differential voltage, proportion control resumes. As the voltage across the temperature sensor 34 changes, the duty cycle changes to vary the average power to the triac and, resultingly, to the heater elements.

Fuses 130 and 132 are provided for the heating elements 26, 28 or 80'90. A capacitor 134 and resistor 136 provided filtering of the power supply to the sensing amplifier 100. The ready indicator 46 is controlled through a pair of unity gain buffer amplifiers 138 and 140. The buffer amplifier 138 transmits a signal corresponding to the temperature of the heating plate 22 as a result of the voltage across the temperature sensor 34 at its non-inverting input. This temperature signal is supplied to a non-inverting input of a differential amplifier 142. A threshold voltage is generated at the buffer amplifier 140 and supplied to the inverting input of the differential amplifier 142. The buffers 138 and 140 remove loading from the sense amplifier 100 circuit. When the threshold level at the inverting input of the differential amplifier transgresses the voltage at the non-inverting input, the LED 46 is turned on to indicate that the heating plate 22 is at operating temperature.

The power indicator 44 is connected across the main power supply to indicate when power is supplied to the circuit. Since an integrated circuit having four differential amplifiers on it is used in the preferred embodiment, the fourth differential amplifier 144 is disabled by connecting its inputs to ground.

Although other modifications and changes may be suggested by those skilled in the art, it is the intention of the inventors to embody within the patent warranted hereon all changes and modifications as reasonably and properly come within the scope of their contribution to the art.

I claim:

1. In a laminator apparatus having at least one heating plate and a control circuit, the laminator apparatus comprising:

a temperature sensor mounted on the at least one heating plate;

a sensing amplifier having first and second sensing inputs and an output, said first input connected to said temperature sensor, said sensing amplifier emitting an alternating signal having a proportionally controlled duty cycle from said output when a signal at said first sensing input exceeds a reference level determined by said second sensing input, said sensing amplifier inhibiting emission of said alternating signal when said signal as said first sensing input is below said reference level;

a plurality of ceramic heating elements connected in parallel and mounted on said at least one heating plate, said plurality of ceramic heating elements each a positive temperature characteristic;

a triac having a gate connected to an output of said sensing amplifier, and transmitting leads connected in series with said plurality of ceramic heating elements to control application of power to said ceramic heating elements;

adjustment means connected to said first input of said sensing amplifier for adjusting a temperature at which said alternating signal is inhibited;

a comparator having a first input at a reference level and a second input connected to said temperature sensor;

a ready condition indicator connected to an output of said comparator to indicate a predetermined temperature condition sensed by said temperature sensor;

at least one pair of rollers mounted to move an item to be laminated past a position adjacent to said at least one heating plate;

a motor connected to drive said at least one pair of rollers; and means for selectively operating said motor when said ready condition indicator indicates said predetermined temperature condition.

2. A control circuit as claimed in claim 1, wherein said at least one heating plate comprises two heating plates mounted opposite one another to define a heating space therebetween, and wherein said at least one pair of rollers comprises two pairs of rollers, a first pair of rollers being mounted at an input of said heating space and a second pair of rollers being mounted at an output of said heating space.

3. A control circuit as claimed in claim 1, wherein the at least one heating plate is of substantially a size of a letter document, and wherein said plurality of ceramic heating elements comprises three ceramic heating elements having a positive temperature characteristic mounted on each of the at least one heating plate.

* * * * *